No. 682,127. Patented Sept. 3, 1901.
J. CARRUTHERS & E. J. FITHIAN.
CLUTCH.
(Application filed Dec. 26, 1899.)

(No Model.)

WITNESSES:

INVENTORS
John Carruthers
Edwin J. Fithian
BY
ATTORNEY.

UNITED STATES PATENT OFFICE.

JOHN CARRUTHERS AND EDWIN J. FITHIAN, OF GROVE CITY, PENNSYLVANIA.

CLUTCH.

SPECIFICATION forming part of Letters Patent No. 682,127, dated September 3, 1901.

Application filed December 26, 1899. Serial No. 741,534. (No model.)

*To all whom it may concern:*

Be it known that we, JOHN CARRUTHERS and EDWIN J. FITHIAN, citizens of the United States, residing at Grove City, in the county of Mercer and State of Pennsylvania, have invented certain new and useful Improvements in Clutches; and we do hereby declare the following to be a full, clear, and exact description of the invention, such as will enable others skilled in the art to which it appertains to make and use the same.

This invention relates to clutches; and it consists in certain improvements in the construction thereof, as will be hereinafter fully described, and pointed out in the claims.

More particularly, our invention relates to that class of clutches shown and described in our Patent No. 641,370, granted January 16, 1900, wherein the construction herein shown is described, but not specifically claimed.

Figure 1:
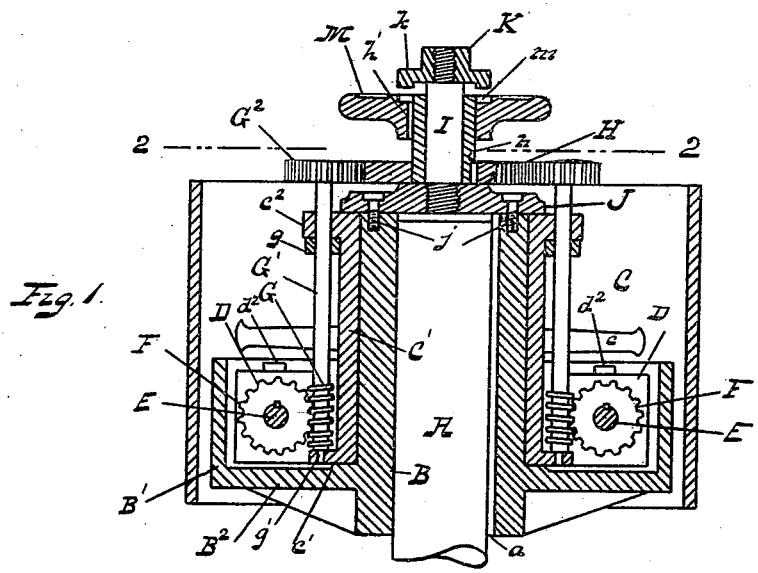
Figure 2:
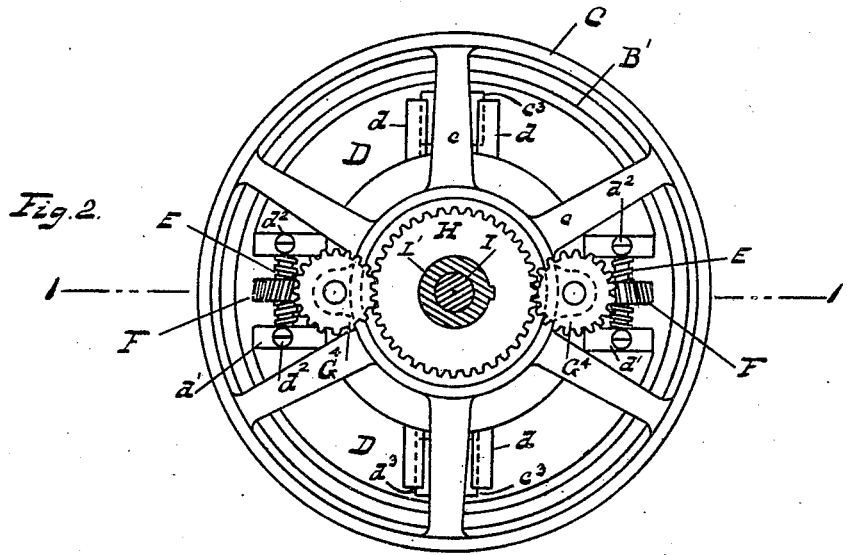

The invention is illustrated in the accompanying drawings, as follows:

Figure 1 shows a section on the line 1 1 in Fig. 2. Fig. 2 shows a section on the line 2 2 in Fig. 1.

A marks the shaft which in the construction shown carries the driving member of the clutch B, which is locked against the rotative movement on the shaft by the key $a$. This driving member comprises the hub or sleeve B, the web $B^2$, which extends outwardly from it, and the flange $B'$, the inner surface of which forms the friction-surface of the driving member.

The pulley C, which may be termed the "driven" member of the clutch, comprises the spoke $c$, extending from a hub $C'$, which is journaled on the hub B of the driving member.

The friction-shoes D D are provided with the guide $d$, in which is a groove $d^3$. (Shown in dotted line.) This groove is arranged to slide on guides $c^3$, preferably carried by the spoke $c$ of the pulley C. At the ends of the shoes are arranged the nuts $d'$, which are preferably removable and secured in place by the set-screws $d^2$. Lugs $d^4$ extend inwardly from the nuts $d'$ into grooves $c^5$ in ears $c'$, extending from the hub $C'$, and serve to guide the ends of the shoes. Reversely-threaded screws E are arranged to operate in the nuts $d'$. The worm-gears F are secured on these screws. Worm-screws G, carried by the rods $G'$, are journaled on the ears $c'$ and $c^2$, extending from the hub of the pulley C. A collar $g$ and a shoulder $g'$ prevent axial movement of the rod in the ears $c'$ and $c^2$. Secured on the rods $G'$ are the gears $G^2$, and these are arranged to mesh a gear H.

A cap J is secured to the driving member by means of the set-screws $j$. This cap extends beyond the driving member B and forms a flange against which the hub $C'$ abuts. An extension I is secured to the cap J, and the gear H is journaled on this extension I. A wheel M is secured to the hub of the gear H by a spline-and-groove mechanism $h'$. Secured to the outer end of the extension I is a detent-plate K, having the detent $k$ thereon. The wheel M is provided with a similar detent $m$, which is adapted to engage detent $k$, thus forming a clutch mechanism, by means of which the gear H is locked with the driving member B.

The operation of the device is as follows: When it is desired to set the clutch, the hand-wheel is drawn out so as to set the auxiliary clutch formed by the detents $k$ and $m$, thus locking the gear H with the driving member B, and as the gears $G^2$ are carried by the driven member which is stationary at this time they are turned by the movement of the gear H, thus actuating the worm-screw G. This actuates the gears F, screws E, and separates the friction-shoes D, setting them against the flange $B'$. So long as there is relative movement between the driving and driven member there will be relative movement between the gears H and $G^2$, so that the frictional pressure is increased so long as such movement continues. To disengage the clutch, the hand-wheel is pushed in so as to bring the auxiliary clutch out of engagement and a brake-pressure is applied to the wheel either by the hands or specially-devised mechanism. This compels the gear H to rotate more slowly than the driving and driven members, thus producing relative movement between the gears H and the gears $G^2$ in an opposite direction to that present during the setting action, and this actuates the worm-screw G, gears F, and screws E to draw the shoes D closer together, and thus disengages the clutch.

What we claim as new is—

1. In a clutch, the combination of the driving and driven members; of the friction-shoes, D D; a reversely-threaded screw operating upon said shoes; a worm-gear secured to said screw; a worm arranged to operate upon said gear; and means actuated by the relative movement of the members one to the other for actuating said worm.

2. In a friction-clutch, the combination of the driving and driven members; a friction device interposed between said members; a gear, H, journaled with the driving member as a center; means for locking said gear with said driving member; the gears, $G^2$, meshing the gear, H; and a friction device actuated by the gears, $G^2$.

3. In a friction-clutch, the combination of the driving member, B; the extension, I, thereon; the gear, H, journaled on the extension, I; the wheel, M; the auxiliary clutch for locking the wheel, M, with the extension, L; gear, $G^2$, arranged to mesh the gear, H; and means actuated by the gear, $G^2$, for centering the clutch mechanism.

4. In a friction-clutch, the combination of the driving and driven members; the gear, H, journaled with the axis of the driving member as a center; means for locking the said gear, H, with the driving member; the gear, $G^2$, arranged to mesh the gear, H; the worm, G, actuated by the gear, $G^2$; the worm-gear, F; the screw, E, actuated by the worm-gear, F; and a friction-shoe, D, actuated by the screw, E.

5. In a clutch, the combination of the driving member B, having the web, $B^2$, and flange, $B'$ thereon; the driven member, C, journaled on said driving member; the clutch-shoes, D; the screws, E, operating upon said shoes; worm-gear, F, secured to said screws; worm, G, arranged to operate said gears; rod, $G'$, extending from the worm, G; gear, $G^2$, fixed on the rod, $G'$; the extension, I, secured to the driving member; the gear, H, journaled on the extension, I; and means for locking the gear, H, with the driving member.

In testimony whereof we affix our signatures in presence of two witnesses.

JOHN CARRUTHERS.
EDWIN J. FITHIAN.

Witnesses:
W. W. GRAHAM,
L. M. FITHIAN.